Patented Nov. 16, 1943

2,334,358

UNITED STATES PATENT OFFICE 2,334,358

ARTIFICIAL CELLULOSIC FILAMENT DE-LUSTERED WITH TITANIUM SALT

Ralph C. Smith, Falls Church, Va., assignor to American Enka Corporation, Enka, N. C., a corporation of Delaware No Drawing. Application November 16, 1938, Serial No. 240,873

13 Claims. (Cl. 260—9)

The present invention is directed to the preparation of new chemical compositions, which compositions are especially useful as delusterants and pigments generally. More particularly, this invention relates to the preparation of delustered artificial fibres and foils.

In the preparation of artificial masses, it is well known to employ various insoluble materials of good hiding power as agents for producing a low luster or opaqueness in the final product. These materials, which are incorporated in the liquid or plastic mass to be delustered, not only must be insoluble in the finished product but must have a refractive index appreciably different from that of the finally formed mass. The degree of opacity or low luster effect is usually dependent on (1) the difference between the refractive index of the delustering material and that of the mass to be delustered and (2) the proportion of delustering material used. The proportion of delustering substance which may be employed is, of course, limited by its effect on the final product. The substances cannot materially harden, embrittle, soften or weaken the formed mass, especially in the preparation of artificial fibres. Hence, if the refractive index of the delusterant is not appreciably different from that of the material to be delustered, such large quantities are necessary to obtain the desired opacity that the finished fibre has wholly undesirable physical characteristics. With hard pigments in large proportions an artificial fibre has little strength, low flexibility and the uniformity or continuity is appreciably impaired. In addition, if materials of high specific gravity are used, they tend to settle out and give non-uniform results, especially if they are first dispersed in a medium or lower viscosity than the viscose solution.

As can readily be seen only a few substances can be found which have the necessary properties of insolubility, stability, suitable refractive index, low specific gravity and other desirable physical and chemical characteristics to give a completely satisfactory finished delustered or pigmented product.

At present, a large proportion of low-luster artificial silk on the market is manufactured from cellulose solutions having incorporated therein either an inorganic pigment, such as titanium dioxide, or an organic compound of the type of pine oil, kerosene, chlorinated diphenyl, or other oils. Another suggested delusterant is the metal salt of an organic acid, namely titanium phthalate. In some cases a combination of an oil and an inorganic pigment is used. Threads having a very low luster closely resembling that possessed by natural silk are also produced by adding a volatile oil with or without a pigment to the spinning solution and upon the extrusion of the solution to form filaments and the subsequent processing steps, at least a portion of the volatile oil is removed leaving pores or pitted places on the surface of the yarn.

Probably the most generally employed delusterant, either alone or in combination, is titanium dioxide. This stable pigment has an index of refraction greatly different from that of threads of cellulosic origin and at the same time it has a high covering power so that small amounts of the same can be used in the production of artificial threads without impairing the strength thereof. However, titanium dioxide is hard and relatively heavy and hence it not only reduces the flexibility of a fibre but it also tends to settle out and thus give a non-uniform result.

It has now been discovered that efficient delustering agents can be prepared from insoluble titanium salts of organic resin acids and of organic acids containing halogen substituents other than halogen in acid halide radicals

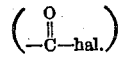

These materials are stable, white, insoluble solids and not only have a refractive index much higher than that of cellulose but also have good covering power. For these reasons they are effective in very small proportions for delustering artificial silk. They are relatively soft, hence they are easily dispersed and do not embrittle the plastic material to be delustered. The density of these compounds is appreciably lower than that of the common inorganic pigments such as titanium dioxide and consequently they are easier to disperse and hold in suspension in a spinning solution. The final products are more uniform in composition and have more desirable physical properties. These new compounds are particularly adapted to be used with other pigmenting or delustering agents such as barium sulphate, chlorinated diphenyl, boron nitride, pine oil and especially titanium dioxide.

These novel organic titanium salts may be prepared from the reaction of an aqueous solution of a water soluble compound of an organic resin and/or halogen-containing acid such as a resin acid sodium soap and an aqueous solution of a reactive salt of titanium. This reaction produces a stable, water-insoluble, white, finely divided material consisting predominantly of the titanium salt of the organic acid. The pigment product may be dried idrectly or it may be separated from the major portion of water by filtration, washed with water and/or alcohol and then dried. The precipitation of the titanium salt may be made in the presence of other finely divided delusterants such as titanium dioxide, Titanox, chlorinated diphenyl or boron nitride. The result is to produce a uniform coating of an organic titanium salt on the surface of the other delusterant. The organic acid employed is preferably a resin acid containing halogen in the molecule in a non-reactive state. The halogen substitution in the organic salt radical or polymer will tend to increase the refractive index of the finished compound, and this increase probably varies in the order of using chlorine, bromine and iodine as a substitution.

The preferred type organic acids are the polymeric carboxylic acids, examples of which include polymers of methacrylic acid and its homologues, phenyl-acrylic acid, crotonic acid, 2 carboxybutadiene 1,3, methylenemalonic acid, fumaric acid, cinnamic acid, linoleic acid, elaeostearic acid, tiglic acid, angelic acid and halogen derivatives of these acids, such as α and β chloroacrylic, chlorocrotonic acids and the corresponding bromo- and iodo- derivatives. The acids, acid anhydrides, nitriles, acid halides or esters may first be polymerized before the titanium salts thereof are prepared. Alternatively, the salts may be prepared in the monomeric state and the polymers later formed. Any of the above acids may be copolymerized with each other and/or with other unsaturated organic compounds such as styrene, trichlorethylene, vinyl chloracetate, vinyl ethers of long and short chain alcohols, vinyl esters of organic acids, such as vinyl acetate, vinyl halides such as vinyl bromide, vinyl chloride and vinyl iodide, isobutylene, isoprene, butadiene, acrolein, bromobutadiene, chlorobutadiene, allyl iodide, allyl bromide, allyl chloride and allyl alcohol.

The halogen substituted compounds such as trichlorethylene and vinyl bromide yield products having the highest refractive index. The physical properties of the final product such as hardness, flexibility, solubility, refractive index and density can be readily controlled by the proper choice of unsaturated acids and copolymerizing agents.

The following examples will serve to illustrate the type of compound used in the present invention but they are not intended to limit the scope thereof.

Example 1

A copolymer of one part of vinyl chloride and two parts acrylic acid is dissolved in hot water containing sufficient caustic soda to neutralize the acid of the copolymer. To this solution is added a slightly acid aqueous solution of titanium sulphate in the proportions equivalent to 25 parts of titanium dioxide to 207 parts of acid copolymer. This will correspond to an excess of titanium sulphate required to form the titanium salt of the acrylic acid in the copolymer. A finely divided precipitate is formed. This precipitate is separated from most of the water, washed several times with fresh water, filtered and, while still slightly wet, washed with alcohol until all the water is removed. The alcohol is then removed to yield the finished delusterant.

Example 2

To 115 grams of the disodium salt of the dichloro derivative of maleic acid dissolved in water is added a slightly acid aqueous solution of 70 grams of titanium sulphate. The reaction product comes down as a finely divided precipitate. It is washed several times with water and finally with methanol. The product is dried and is then ready for use as a delusterant.

Example 3

A slurry is prepared by mixing 320 grams of titanium dioxide with 2500 grams of a slightly acid, aqueous solution containing titanium sulphate equivalent to 10 grams of titanium dioxide. To this solution is added 350 grams of an aqueous solution containing 50 grams of the sodium salt of the copolymer of equal parts of maleic acid and vinyl methyl ether.

In a similar manner the titanium salt of other organic chlorine-containing and/or resin acid can be prepared by reacting a water solution of a water soluble derivative thereof with an aqueous solution of a reactive salt of titanium.

It is not necessary to employ the sodium salt but other water soluble derivatives such as the potassium, ammonium and substituted ammonium salts, can be employed.

Other organic resin and/or halogen-containing acids of which the titanium salts can similarly be prepared are abietic, mono- and poly-chlorophthalic acids, chloroabietic acids, chloronaphthenic acids, chlorobenzoic acids, chlorophenylbenzoic acids, chloropropionic acids, chlorolinoleic acids, chloroeleaostearic acids, chloromalonic acids, chloromaleic acids, glycerol phthalate resins of high acid number, polymerized abietic acid. Although the monobasic acid salts are operative, the acids containing a plurality of carboxylic acid groups are superior. Many of the compounds such as titanium chlorolinoleate also have a desirable lubricating effect on the finished product. The halogen substituents in the chlorine-containing acids may be introduced after the formation of the final salt. The refractive index of the titanium salts is further increased by this halogenation of the finished salts. This is especially feasible in the case of the compounds which contain double linkages between carbon atoms whether of chain or ring structure. A titanium salt of a polymer prepared from at least one constituent containing a plurality of double bonds such as chlorobutadiene, or 2 carboxy butadiene 1,3 is readily chlorinated or halogenated to yield a product of even higher refractive index. Mixed salts of titanium and other metals or of titanium with a plurality of acids with or without other metals can likewise be prepared and used for the present purpose.

In the case of organic acids containing a plurality of carboxy groups such as in the polymeric carboxylic acids, if a few of the acid groups are left unsubstituted by titanium, the product, although not water soluble, will tend to be self-dispersed in an alkaline media such as in a viscose solution.

Whereas, it is contemplated that low-luster artificial filaments can be manufactured by using these compounds in conjunction with any of the known processes such as the viscose, cuprammonium, acetate or the nitrocellulose process, the detailed description will be exemplified by the viscose process. In the preparation of the viscose solution for spinning, cellulose sheets are treated with an alkali solution. The cellulose sheets impregnated with the caustic soda solution are disintegrated in a shredding apparatus. This shredding step offers a good opportunity to add and finely disperse a pigment in the mass of alkali cellulose under treatment. However, it is not essential that the novel pigments be introduced at this point. The resulting alkali cellulose is allowed to ripen or age. The alkali cellulose is then subjected to the action of carbon disulphide to form cellulose xanthate. The next step in the process is to form the viscose solution by dissolving the xanthate in dilute sodium hydroxide. It is during this dissolving period that these novel agents are preferably added, although this invention contemplates adding the pigment or delusterant at any stage during the manufacture of the viscose solution prior to extrusion. In order to effect a uniform dispersion of the material throughout the viscose solution, it is usually desirable to preliminarily mix up a batch of the material in a liquid such as pine oil, a weak caustic solution or even a portion of the viscose solution, whereafter this mixture is finely ground in a ball mill or the like and added to a small portion of the viscose solution per se. This method has been found to give an excellent uniform distribution of the pigment particles. The small portion of the viscose solution containing the pigment particles is finally introduced into the bulk of the viscose solution. The solution is then extruded or spun in the usual manner to form threads.

A very low-luster yarn can be prepared by utilizing small proportions of pigment from one tenth of one per cent to ten per cent based on the cellulose content. It has been determined that delustered viscose artificial silk thread can be produced closely simulating that of natural silk by incorporating in the viscose solution prior to spinning less than 5.0% of the novel titanium salt based on the cellulose content.

*Example 4*

A cellulose xanthate spinning solution is prepared containing 100 parts of cellulose and to this solution is added a thin aqueous dispersion of 2 parts of the product of Example 1. A portion of the spinning solution is used for this purpose. The aqueous dispersion of delusterant is then uniformly mixed with the major portion of the spinning solution. The finished spinning solution is finally extruded through a spinneret into a sulphuric acid bath to form flexible delustered filaments.

The procedure can be applied equally well to the formation of films, sheets or plastic masses generally.

The novel agents may be used alone or in combination with the numerous other organic or inorganic delusterants and pigments known in the art today. A combination of these substances with chlorinated diphenyls and boron nitride or titanium dioxide is very effective. The chlorinated diphenyl may be replaced in whole or in part with pine oil or turpentine. The substance may be prepared in the presence of any of these substances and in the case of solid pigments such as titanium dioxide, barium sulphate, boron nitride or mixtures thereof, the novel compound may be precipitated on the surface to give unusually effective results. Although the basic pigments to be coated with the novel titanium salts are preferably white, it is not necessary that this be the case and other pigments can be similarly coated. The resulting pigments greatly resist chalking such as is commonly encountered with titanium dioxide per se.

It is to be understood that it is within the scope of this invention to include all the obvious variations in the procedure commonly employed in the artificial silk and other plastic industries. The invention is to be construed as limited only as set forth in the appended claims.

I claim:

1. In the process of making formed structures from viscose solutions, the steps of incorporating in the viscous solution to be formed an insoluble titanium salt of a copolymer of acrylic acid and vinyl chloride.

2. A delusterant and pigment comprising an insoluble titanium salt of a copolymer of acrylic acid and vinyl chloride.

3. A low-luster, artificial silk filament containing therein finely divided and uniformly distributed particles of an insoluble titanium salt of a copolymer of acrylic acid and vinyl chloride.

4. In the manufacture of dull luster, artificial cellulosic filaments and the like, the step of incorporating in the cellulosic solution to be spun an insoluble titanium salt of a polymer of an organic unsaturated carboxylic acid in which acid the unsaturated aliphatic chain is substituted only by radicals of the group consisting of hydrogen, hydrocarbon, carboxyl and halogen radicals.

5. In the manufacture of dull luster, artificial cellulosic filaments and the like, the step of incorporating in the cellulosic solution to be spun an insoluble titanium salt of a polymer of an organic alpha-beta unsaturated carboxylic acid in which acid the unsaturated aliphatic chain is substituted only by radicals of the group consisting of hydrogen, hydrocarbon, carboxyl and halogen radicals.

6. In the manufacture of dull luster, artificial cellulosic filaments and the like, the step of incorporating in the cellulosic solution to be spun an insoluble titanium salt of a halogen substituted polymer of an organic unsaturated carboxylic acid in which acid the unsaturated aliphatic chain is substituted only by radicals of the group consisting of hydrogen, hydrocarbon, carboxyl and halogen radicals.

7. In the manufacture of dull luster, artificial cellulosic filaments and the like, the step of incorporating in the cellulosic solution to be spun an insoluble titanium salt of a chlorine substituted polymer of an organic alpha-beta unsaturated carboxylic acid in which acid the unsaturated aliphatic chain is substituted only by radicals of the group consisting of hydrogen, hydrocarbon, carboxyl and halogen radicals.

8. In the process of making formed structures from viscose solutions, the steps of incorporating in the viscose solution to be formed an insoluble titanium salt of a polymer of an organic unsaturated carboxylic acid in which acid the unsaturated aliphatic chain is substituted only by radicals of the group consisting of hydrogen, hydrocarbon, carboxyl and halogen radicals.

9. In the process of making formed structures from viscose solutions, the steps of incorporating in the viscose solution to be formed an insoluble titanium salt of a polymer of an organic alpha-beta unsaturated carboxylic acid in which acid the unsaturated aliphatic chain is substituted only by radicals of the group consisting of hydrogen, hydrocarbon, carboxyl and halogen radicals.

10. In the process of making formed structures from viscose solutions, the steps of incorporating in the viscose solution to be formed an insoluble titanium salt of a halogen substituted polymer of an organic alpha-beta unsaturated carboxylic acid in which acid the unsaturated aliphatic chain is substituted only by radicals of the group consisting of hydrogen, hydrocarbon, carboxyl and halogen radicals.

11. In the process of making formed structures from viscose solutions, the steps of incorporating in the viscose solution to be formed an insoluble titanium salt of a chlorine substittued polymer of an organic alpha-beta unsaturated carboxylic acid in which acid the unsaturated aliphatic chain is substituted only by radicals of the group consisting of hydrogen, hydrocarbon, carboxyl and halogen radicals.

12. A low-luster, artificial silk cellulosic filament containing therein finely divided and uniformly distributed particles of an insoluble titanium salt of a polymer of an organic alpha-beta unsaturated carboxylic acid in which acid the unsaturated aliphatic chain is substituted only by radicals of the group consisting of hydrogen, hydrocarbon, carboxyl and halogen radicals.

13. A low-luster, artificial silk cellulosic filament containing therein finely divided and uniformly distributed particles of an insoluble titanium salt of a chlorine substituted polymer of an organic alpha-beta unsaturated carboxylic acid in which acid the unsaturated aliphatic chain is substituted only by radicals of the group consisting of hydrogen, hydrocarbon, carboxyl and halogen radicals.

RALPH C. SMITH.